July 1, 1930. R. H. KRUSE 1,769,373
METHOD OF AND APPARATUS FOR CONTROLLING AND ALSO
PROPORTIONING FLOW OF COMBUSTIBLE FLUIDS
Filed June 26, 1922 2 Sheets-Sheet 1
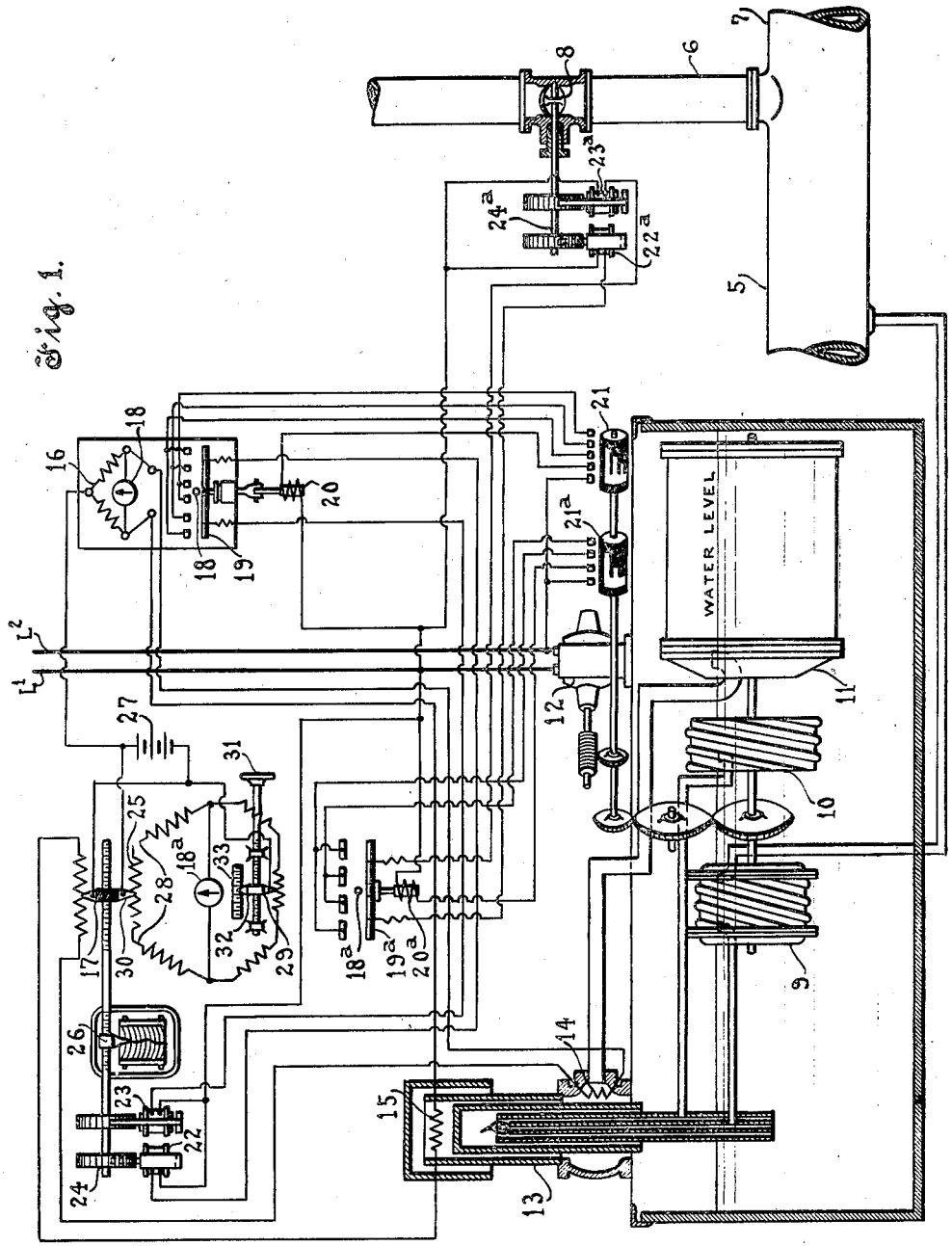
INVENTOR.
Ralph H. Kruse
BY
ATTORNEY.

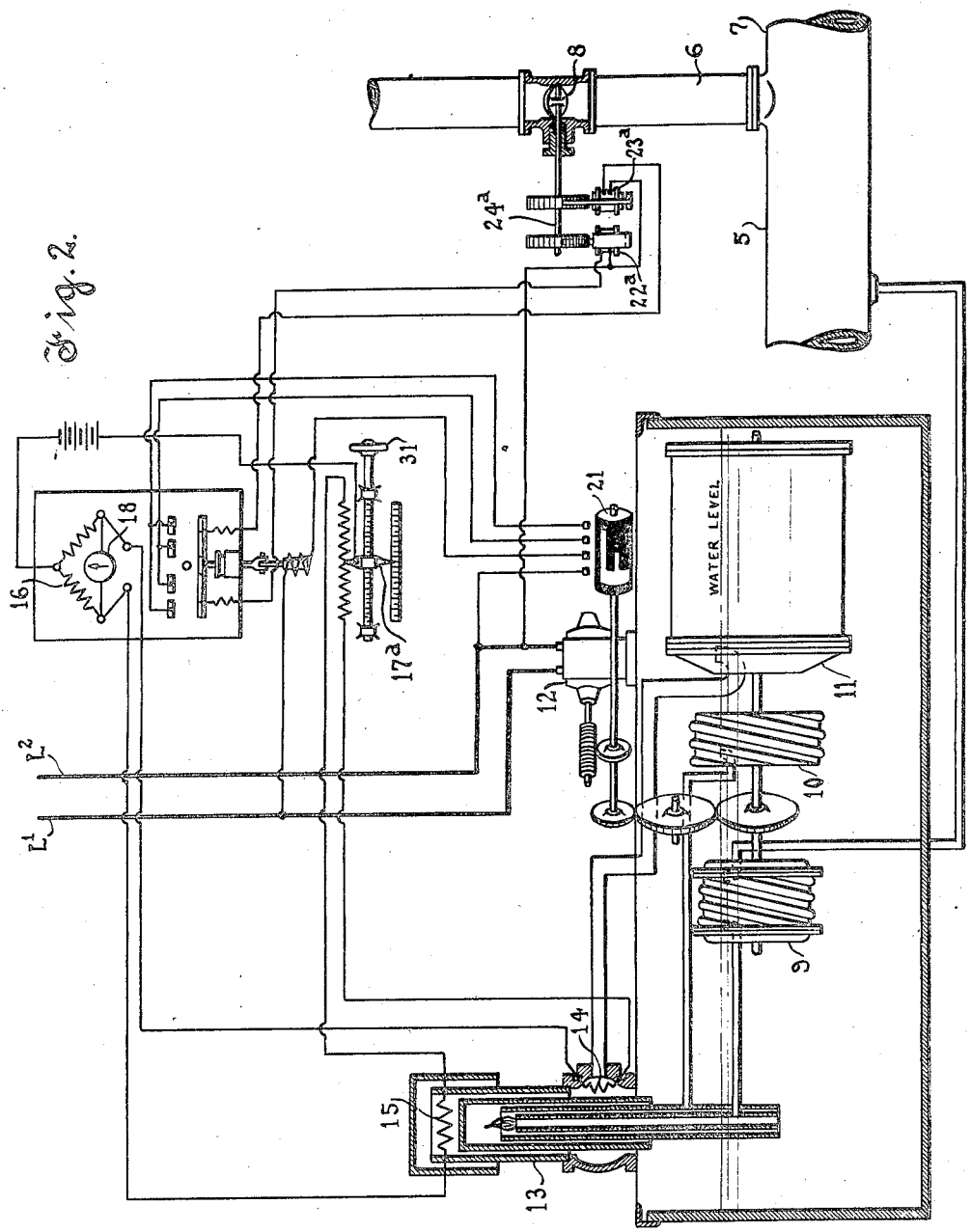

UNITED STATES PATENT OFFICE

RALPH H. KRUSE, OF MILWAUKEE, WISCONSIN, ASSIGNOR, BY MESNE ASSIGNMENTS, TO CUTLER-HAMMER, INC., A CORPORATION OF DELAWARE

METHOD OF AND APPARATUS FOR CONTROLLING AND ALSO PROPORTIONING FLOW OF COMBUSTIBLE FLUIDS

Application filed June 26, 1922. Serial No. 571,018.

This invention relates to methods of and apparatus for controlling and also proportioning flows of combustible fluid.

More particularly the invention relates to control of the flow of combustible fluid and proportioning the rates of flow of a plurality of combustible fluids.

An object of the invention is that of providing a method of proportioning the flows of a plurality of intermingling combustible fluids in accordance with the combustion calorific value or gross heating value of the mixture thereof.

Another object is that of providing a method of supplying combustible fluid of a given regulable combustion calorific value.

Another object is that of providing apparatus for enactment of the foregoing methods.

Other objects and advantages will hereinafter appear.

In the accompanying drawing, wherein are illustrated certain of the embodiments which the invention may assume in practice.

Figure 1 is a diagrammatic and schematic view illustrative of one such construction; while Fig. 2 is a similar view illustrating a slightly modified construction.

In each of the constructions illustrated combustible fluids which differ from one another in combustion calorific value are supplied to and caused to mix within a common conduit 5 by means of a plurality of individual conduits indicated at 6 and 7. Changes in combustion calorific value of the mixed fluid are caused to effect regulation of the rate of flow of certain of said individual fluids to thereby vary the quantitative proportioning of such individual fluids to compensate for such variation in calorific value of the mixture, whereby the calorific value of the mixture may be maintained constant or may be varied at will irrespective of variation in calorific value or rate of flow, or both, of any one or more of said individual fluids.

While the rate of flow of each of the individual fluids may be subjected to control as aforedescribed, such expedient is in nowise necessary since the desired calorific value of the mixture may be maintained through regulation of less than all the individual streams.

Thus in the constructions illustrated, two individual streams of fluid are indicated, the herein contemplated control being applied to but one of such streams, whereby variation in calorific value or relative rate of flow or either stream will produce a change in calorific value of the mixed or combined stream flowing in conduit 5 and such change is in turn adapted to vary the control to which the controlled stream is subjected in a manner to compensate for such variations in calorific value or rate of flow of either fluid.

The means employed for direct control of the flow of the controlled individual fluid may comprise any of the suitable known devices for such purpose, as for example when a prime mover is employed for inducing the controlled flow of fluid such prime mover may be subjected to suitable speed or other control, whereas for simplicity of illustration, the control means is shown as comprising a power operated valve 8 located in conduit 6 for a similar purpose.

Again, the apparatus for subjecting the flow regulating means to control in accordance with the calorific value of the flow of fluid in conduit 5 may comprise any reliable and accurate calorimetric device having a movable part whose movement may be utilized for imposing such control upon the particular flow regulating means employed.

Preferably such calorimetric device may comprise apparatus of the character disclosed and claimed in Patent No. 1,625,277, dated April 19, 1927, to Horace N. Packard, whereas portions of the mechanism which may preferably be employed for subjecting the valve 8 to control of such calorimetric device are disclosed, inter alia, in a patent of said Horace N. Packard, 1,437,611, dated December 5, 1922. Thus since the novelty herein does not reside in the aforementioned apparatus per se or in the details thereof, such apparatus will be described only with such particularity as to enable and facilitate a complete understanding of the present methods and the means for their enactment.

Following herein the disclosure of the aforementioned Patent No. 1,625,277, test gas, comprising in the present instance a continuous sample of combustible fluid from conduit 5, combustion air and cooling air are supplied in regulated proportions by volume and preferably under like conditions of temperature, pressure and saturation by means of individual wet displacement pumps 9, 10 and 11, driven by a common motor 12, to a burner 13 for combustion of the test gas and combustion air and absorption by the cooling air of the heat so liberated.

Resistance thermometers 14 and 15 are arranged in the stream of cooling air to be subjected respectively to the temperature of the latter before and after the heat transfer, said resistance thermometers being connected in a Wheatstone bridge, indicated at 16, having associated devices arranged to be influenced thereby for operating suitable instrumentalities including a member 17 adapted to be moved in a direction and to a degree corresponding with the character and value of any variations in combustion calorific value of the test gas.

The instrumentalities directly controllable by the Wheatstone bridge may preferably include a galvanometer needle 18 having associated therewith a switch 19 having an operating solenoid 20 which serves in conjunction with a contact drum 21 driven by motor 12 to control the operating electromagnets 22 and 23 of a ratcheting mechanism 24. Said ratcheting mechanism in turn is utilized to move the member 17 for varying the resistance of an adjusting rheostat 25 connected in the Wheatsone bridge to restore the balance of the latter following unbalancing thereof due to variation in calorific value of the fluid in conduit 5. A recorder 26 may also be operatively connected with the driven member of said ratcheting mechanism although such feature is not essential herein.

In practice the motor 12 together with the Wheatstone bridge and the operating coils for the various switches may all be supplied from a common source of direct current, although in the construction illustrated the Wheatstone bridge is indicated as supplied with direct current from a battery 27, the other instrumentalities being supplied from a separate source of current indicated at lines $L'$, $L^2$.

The aforedescribed elements comprise the essentials of a standard type of calorimeter and hence warrant no more extended description herein.

The actuating mechanism for valve 8 includes a ratcheting mechanism $24^a$ similar to the mechanism 24 and provided with corresponding operation solenoids $22^a$ and $23^a$ under control of a second Wheatstone bridge indicated at 28 in association with a galvanometer having a needle $18^a$, a switching device $19^a$ having an operating solenoid $20^a$, and a contact drum $21^a$ also driven by motor 12.

The solenoids $20^a$, $22^a$ and $23^a$ are also arranged to be energized from lines $L'$, $L^2$ whereas Wheatstone bridge 28 is similarly connected across battery 27, such connections being effected by means of adjustable sliders 29 and 30 whereby the resistance in the various portions of the bridge may be adjusted. The slider 29 is provided with manual adjusting or setting means indicated at 31 and is further provided with a pointer 32 to co-operate with a fixed scale 33 which is preferably calibrated in B. T. U. or other standard units of calorific value.

Slider 30 on the other hand is carried by and constrained to move with the member 17 of the calorimeter whereby upon movement of said member 17 to restore the balance of Wheatstone bridge 16 following unbalance of the latter due to variation in combustion calorific value of fluid flowing in the conduit 5 said slider 30 is also moved through a similar distance and is adapted to cause a corresponding degree of unbalance of the Wheatstone bridge 28, assuming the latter to have been previously in balance. Such unbalancing of the bridge 28 will of course result in deflection of the galvanometer needle $18^a$ in a direction and to a degree determined by the direction and extent of movement of slider 30 the latter being in turn determined by the degree and character of unbalance of Wheatstone bridge 16. Such deflection of needle $18^a$ of course results in clamping of the same against one of the upper contacts of the switching device $19^a$ upon the next periodic actuation thereof as timed by the drum $21^a$ in the well known manner. Such clamping of the needle $18^a$ in turn serves to complete the energizing circuit of one of the ratcheting solenoids $22^a$ and $23^a$ dependent upon the direction of deflection of said needle $18^a$ whereupon the ratcheting device will be actuated through a predetermined angle for opening or closing of the valve 8 dependent upon the character of the change in calorific value of the fluid flowing in conduit 5 and in a sense such as to compensate for such variation.

In the complete operation of the device the slider 29 is adjusted manually by the means indicated at 31 until the pointer 32 indicates upon scale 33 the calorific value which it is desired to maintain for the fluid flowing in conduit 5. Such adjustment will of course produce unbalancing of the bridge 28, assuming the latter to have been previously in balance, and hence the galvanometer needle 18ª will be at once deflected with consequent adjustment of the valve 8 as just described in a manner and to a degree such as to re-apportion the quantities of fluid flowing in conduits 6 and 7 to restore the combustion calorific value or gross heating value of the mixture of such fluids flowing in conduit 5 to the desired value as indicated upon scale 33.

Such action will of course vary the value of the heat exchange in burner 13 whereupon Wheatstone bridge 16 becomes correspondingly unbalanced with consequent actuation of the ratcheting mechanism 24 such as to bring both Wheatstone bridges simultaneously into a state of balance, which condition will thereafter obtain unless or until a change occurs either in the calorific value of one or both of the fluids flowing in the respective conduits 6 and 7 or in their relative rates of flow or unless or until a subsequent adjustment of the voluntary operating means 30 is effected.

As soon as either the combustion calorific value of one of the individual fluids varies or the relative rates of flow of such fluids vary obviously either of such events will produce a definite change in combustion calorific value of the fluid flowing in conduit 5. Such change will of course produce a variation in value of the heat exchange in burner 13 with resultant change in temperature to which the exit resistance thermometer 15 is subjected and hence Wheatstone bridge 16 will become unbalanced and the ratcheting mechanism 24 will be actuated to move the member 17 for restoring such balance.

Such action will of course produce a corresponding degree of unbalance in the Wheatstone bridge 28 whereupon ratcheting mechanism 24ª is actuated for varying the opening of the valve 8 in a manner and in a degree to re-apportion the rates of flow of the fluids in conduits 6 and 7 to thereby restore the desired combustion calorific value of the fluid flowing in conduit 5.

Such actuation of the valve 8 will immediately cause the bridge 16 to become again unbalanced but in the opposite sense. Thereupon the slider member 17 is again actuated to restore the balance of both bridges, the valve 8 remaining in its newly adjusted position wherein the combustion calorific value of the fluid flowing in conduit 5 is determined by the setting of slider 29 and indicated upon scale 33 and such relation of the various parts will thereafter obtain pending a change in one or more of the aforementioned conditions.

The device thus provides for maintaining automatically a predetermined combustion calorific value of the fluid flowing in conduit 5 irrespective of variations in calorific value or relative rates of flow of the fluids in conduits 6 and 7, and also provides for varying such predetermined calorific value at will.

The construction illustrated in Fig. 2 is adapted to operate on precisely the same principle as that aforedescribed, but has been materially simplified. Thus, in this construction but a single Wheatstone bridge, galvanometer, clamping switch and contacting drum are employed.

Such Wheatstone bridge corresponds with the bridge 16 of Fig. 1 and is similarly designated, whereas in the construction of Fig. 2 the contacting slider 17ª is adapted to be adjusted at will to cause the Wheatstone bridge to be in balance when the valve 8 is so positioned as to provide the desired combustion calorific value of the composite flow of fluid in conduit 5.

Thus, whenever such calorific value of said flow of fluid tends to depart from the value so preselected the Wheatstone bridge becomes unbalanced in a like sense and to a corresponding degree. Such unbalance serves, as aforedescribed, to cause adjustment of the valve 8 to restore the desired calorific value of said fluid, whereupon the bridge again becomes balanced and such conditions will obtain pending further change in constitution of the composite flow of fluid, or until a different setting of the slider 17ª is effected.

What I claim as new and desire to secure by Letters Patent is:

1. The method of controlling the rate of flow of a constituent of a composite combustible fluid flow which comprises subjecting the flow of said constituent to a controlling influence and varying the value per unit volume of such influence in accordance with the gross heating value of said composite combustible fluid flow.

2. The method of controlling the gross heating value of a flow of combustible fluid which comprises combining therewith a flow of combustible fluid of different heating value and automatically varying the flows of said fluids to maintain constant the gross heating value per unit volume of the mixture thereof.

3. The method of controlling the gross heating value per unit volume of a composite flow of combustible fluid, which comprises subjecting certain of its constituent combustible fluid flows to rate control and subjecting such control to influence of variations in gross heating value per unit volume of the composite fluid flow.

4. The method of maintaining substantially a given gross heating value per unit volume of a composite flow of combustible fluid, which comprises subjecting the rate of certain of the constituent flows of said composite flow to regulation in accordance with and to compensate for any variations in gross heating value per unit volume of said composite flow.

5. The method of maintaining substantially a given gross heating value per unit volume of a composite flow of combustible fluid, which comprises burning a sample flow of fluid of said composite flow to determine the gross heating value per unit volume of such flow and regulating the rate of certain of the constituent combustible flows of said composite flow in accordance with the value of the determinations so obtained.

6. The method of maintaining substantially a given gross heating value per unit volume of a composite flow of combustible fluid, which comprises burning a sample flow of the fluid of said composite flow in a manner to determine the gross heating value per unit volume of the latter and direct thermo-electric regulation of the rate of flow of certain of the combustible constituents of said composite flow in accordance with the value of the determinations so obtained.

7. Apparatus for maintaining substantially constant the gross heating value per unit volume of a composite flow of combustible fluids, which comprises branch conduits for the respective constituent combustible flows of fluids, a main conduit to receive said constituent combustible fluids to provide a composite flow or mixture thereof, a fluid combustion calorimeter, means including a pump for continuously withdrawing and conveying a regulated quantity of said composite flow of combustible fluids from said main conduit wherein said constituent combustible fluids are mixed to said calorimeter to be burned by the latter, means for supplying to the calorimeter a regulated quantity of air for combustion, a valve in one of said branch conduits, electrical operating means for said valve, and means for subjecting said operating means to direct control by said calorimeter whereby the rate of flow of one of said constituent combustible fluids is varied in accordance with and to compensate for variations in the gross heating value per unit volume of said composite combustible fluid flow.

8. Apparatus for maintaining substantially a given gross heating value per unit volume of a composite flow of combustible fluids whose constituent combustible flows may all vary in rate relative to each other and in gross heating value per unit volume which comprises, in combination, a branch conduit for each of said combustible fluid flows, a main conduit to receive said constituent combustible fluid flows to provide a composite flow or mixture thereof, an adjustable valve in one of said branch conduits for directly regulating the rate of flow of one of said constituent combustible fluid flows, a fluid combustion calorimeter, pump means for continuously withdrawing a regulated quantity of said composite flow of combustible fluids from said main conduit, means for conveying said regulated quantity of said composite flow to said calorimeter to be burned by the latter to provide for determination of the gross heating value per unit volume of said composite flow of combustible fluids, means for supplying to the calorimeter a regulated quantity of air for combustion, and electrical means for subjecting said adjustable valve to direct control by said calorimeter to thereby compensate for any changes in said gross heating value.

In witness whereof, I have hereunto subscribed my name.

RALPH H. KRUSE.

CERTIFICATE OF CORRECTION.

Patent No. 1,769,373.                                       Granted July 1, 1930, to

RALPH H. KRUSE.

It is hereby certified that error appears in the printed specification of the above numbered patent requiring correction as follows: Page 1, line 60, for "or" read of; page 2, line 67, for the word "operation" read operating, and line 118, for "closing" read closure; page 3, lines 105 and 106, claim 1, strike out the words "per unit volume" and insert the same to follow "value" line 107, of same claim; and that the said Letters Patent should be read with these corrections therein that the same may conform to the record of the case in the Patent Office.

Signed and sealed this 9th day of September, A. D. 1930.

(Seal)                                                                M. J. Moore,
Acting Commissioner of Patents.